(12) United States Patent
Kholodkov et al.

(10) Patent No.: US 12,411,677 B2
(45) Date of Patent: Sep. 9, 2025

(54) DEPLOYMENT SEQUENCING FOR DEPENDENT UPDATES

(71) Applicant: Microsoft Technology Licensing, LLC, Redmond, WA (US)

(72) Inventors: Dmitry Valentinovich Kholodkov, Seattle, WA (US); Rahul Nigam, Bothell, WA (US); Nidhi Verma, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 38 days.

(21) Appl. No.: 17/974,118

(22) Filed: Oct. 26, 2022

(65) Prior Publication Data
US 2024/0143303 A1 May 2, 2024

(51) Int. Cl.
| | | |
|---|---|---|
| *G06F 8/60* | (2018.01) | |
| *G06F 8/36* | (2018.01) | |
| *G06F 8/65* | (2018.01) | |
| *G06F 8/658* | (2018.01) | |
| *G06F 16/27* | (2019.01) | |
| *H04L 67/00* | (2022.01) | |
| *H04L 67/1001* | (2022.01) | |
| *H04L 67/60* | (2022.01) | |

(52) U.S. Cl.
CPC ............... *G06F 8/65* (2013.01); *G06F 8/36* (2013.01); *G06F 8/658* (2018.02); *G06F 16/27* (2019.01); *H04L 67/1001* (2022.05); *H04L 67/34* (2013.01); *H04L 67/60* (2022.05)

(58) Field of Classification Search
CPC ..... H04L 67/34; H04L 67/60; H04L 67/1001; G06F 8/36; G06F 8/65; G06F 8/658; G06F 16/27
See application file for complete search history.

(56) References Cited

U.S. PATENT DOCUMENTS

| | | | | |
|---|---|---|---|---|
| 2004/0230619 | A1* | 11/2004 | Blanco | G06F 16/27 |
| 2005/0228798 | A1* | 10/2005 | Shepard | H04L 67/34 |
| 2006/0080651 | A1* | 4/2006 | Gupta | G06F 8/658 |
| | | | | 717/169 |
| 2006/0184927 | A1 | 8/2006 | Deblaquiere | |

(Continued)

OTHER PUBLICATIONS

International Search Report and Written Opinion received for PCT Application No. PCT/US2023/032814, Dec. 15, 2023, 17 pages.

(Continued)

*Primary Examiner* — Tuan A Vu
(74) *Attorney, Agent, or Firm* — Han Gim; Newport IP, LLC

(57) ABSTRACT

Systems and methods for deploying dependent updates include mechanisms for requiring that dependency information be provided for each update so that dependent updates may be identified. Update dependencies are tracked so that dependent updates are not deployed until parent updates have been completed. Deployment sequencing is implemented on top of existing asynchronous deployment policies so that asynchronous workflow remains intact and unaltered. The asynchronous workflow is upgraded to a synchronous (i.e., sequential) workflow for updates having dependencies to ensure that updates having dependencies are applied in the correct order.

14 Claims, 6 Drawing Sheets

(56) References Cited

U.S. PATENT DOCUMENTS

| | | | | |
|---|---|---|---|---|
| 2007/0143390 | A1* | 6/2007 | Giambalvo | H04L 67/34 |
| | | | | 709/200 |
| 2007/0240152 | A1* | 10/2007 | Li | G06F 8/65 |
| | | | | 717/124 |
| 2012/0272228 | A1 | 10/2012 | Marndi | |
| 2013/0227100 | A1* | 8/2013 | Dobies | H04L 67/1001 |
| | | | | 709/223 |
| 2015/0358198 | A1* | 12/2015 | Mahajan | H04L 67/60 |
| | | | | 709/221 |
| 2019/0227794 | A1* | 7/2019 | Mercille | G06F 8/36 |
| 2020/0050444 | A1 | 2/2020 | Nikam | |
| 2021/0349710 | A1* | 11/2021 | Kang | G06F 8/658 |
| 2023/0244528 | A1* | 8/2023 | Zhang | G06F 8/65 |
| | | | | 718/104 |

OTHER PUBLICATIONS

International Preliminary Report on Patentability (Chapter 1) received for PCT Application No. PCT/US2023/032814, May 8, 2025, 12 pages.

* cited by examiner

DEPLOYMENT SEQUENCING FOR DEPENDENT UPDATES

BACKGROUND

Cloud-based services provide computing services over the Internet or a dedicated network. The cloud-based services may provide computing resources, analytics, storage, and network resources to customers. These services may include, but are not limited to applications for creating, consuming, and/or modifying content, file storage and management platforms, collaboration and communications platforms, and other types of software as a service. The architecture of a typical cloud-based service includes numerous servers, network devices, and storage elements to support the services provided. These devices include software, data, and configuration files that need to be periodically updated to add new features, and to roll out fixes to software and/or configuration. Furthermore, some services may support software installed on the client devices, and this software may also need to be updated to a newer version to support added features and/or to fix problems associated with a current version of the software.

Updates are typically rolled out in multiple stages to different groups of devices and/or users to mitigate the risk associated with deploying the new version of the software and/or configuration data. This approach is referred to as ring deployment. The deployment process is represented by an expanding series of rings, where each ring includes deploying the update to a larger subset of the userbase being provided access to the update. The underlying hardware and software that support the subset of the userbase associated with the ring is updated. User feedback and telemetry data may be collected from users associated with each ring to determine whether the new version of the software is operating correctly before deploying the updates to the next ring. This process may continue until the update is deployed across the entire userbase.

In some cases, updates may include changes, such as new and/or updated product features, that have dependencies defined in a previous update. Rolling out such changes across the various systems of a cloud-based service in stages is often not a straightforward process. Ring deployment by nature is an asynchronous process. For example, subsystems of a cloud-based service may have different deployment configurations that define how changes are deployed across these subsystems. The rings for deploying the updates across one subsystem may not completely align with the rings for deploying updates across another system of the cloud-service. As a result, updates may be delivered to different subsystems in random orders. In some cases, updates may be delivered to a subsystem earlier than the update from which it depends. This can cause feature dependency sequence violation and possible product functionality loss.

Hence, there is a need for a deployment system that enables control and specification of the deployment sequence to prevent out of sequence delivery of updates while also minimizing deployment delays, and that ensures that any information that is needed to determine the appropriate deployment policy for a job is provided.

SUMMARY

In one general aspect, the instant disclosure presents a data processing system having a processor and a memory in communication with the processor wherein the memory stores executable instructions that, when executed by the processor, cause the data processing system to perform multiple functions. The function may include receiving a payload definition defining an update to be deployed to a group of computing resources, the payload definition including attribute information, the attribute information including dependency information for the update; determining whether the update is a dependent update based on the dependency information; in response to the dependency information indicating that the update is a dependent update, creating an update stage for a current deployment stage with work items for applying the update to the computing resources associated with the current deployment stage; monitoring a parent update of the dependent update for completion; and in response to the parent update being completed, executing the work items so as to apply the update to the computing resources associated with the current deployment stage.

In yet another general aspect, the instant disclosure presents a method of deploying dependent updates to a group of computing resources. The method includes receiving a payload definition defining an update to be deployed to the group of computing resources, the payload definition including attribute information, the attribute information including dependency information for the update; determining whether the update is a dependent update based on the dependency information; in response to the dependency information indicating that the update is a dependent update, creating an update stage for a current deployment stage with work items for applying the update to the computing resources associated with the current deployment stage; monitoring a parent update of the dependent update for completion; and in response to the parent update being completed, executing the work items so as to apply the update to the computing resources associated with the current deployment stage.

In a further general aspect, the instant application describes a non-transitory computer readable medium on which are stored instructions that when executed cause a programmable device to perform functions of receiving a payload definition defining an update to be deployed to a group of computing resources, the payload definition including attribute information, the attribute information including dependency information for the update; determining whether the update is a dependent update based on the dependency information; in response to the dependency information indicating that the update is a dependent update, creating an update stage for a current deployment stage with work items for applying the update to the computing resources associated with the current deployment stage; monitoring a parent update of the dependent update for completion; and in response to the parent update being completed, executing the work items so as to apply the update to the computing resources associated with the current deployment stage.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example

DETAILED DESCRIPTION

Figure 1:
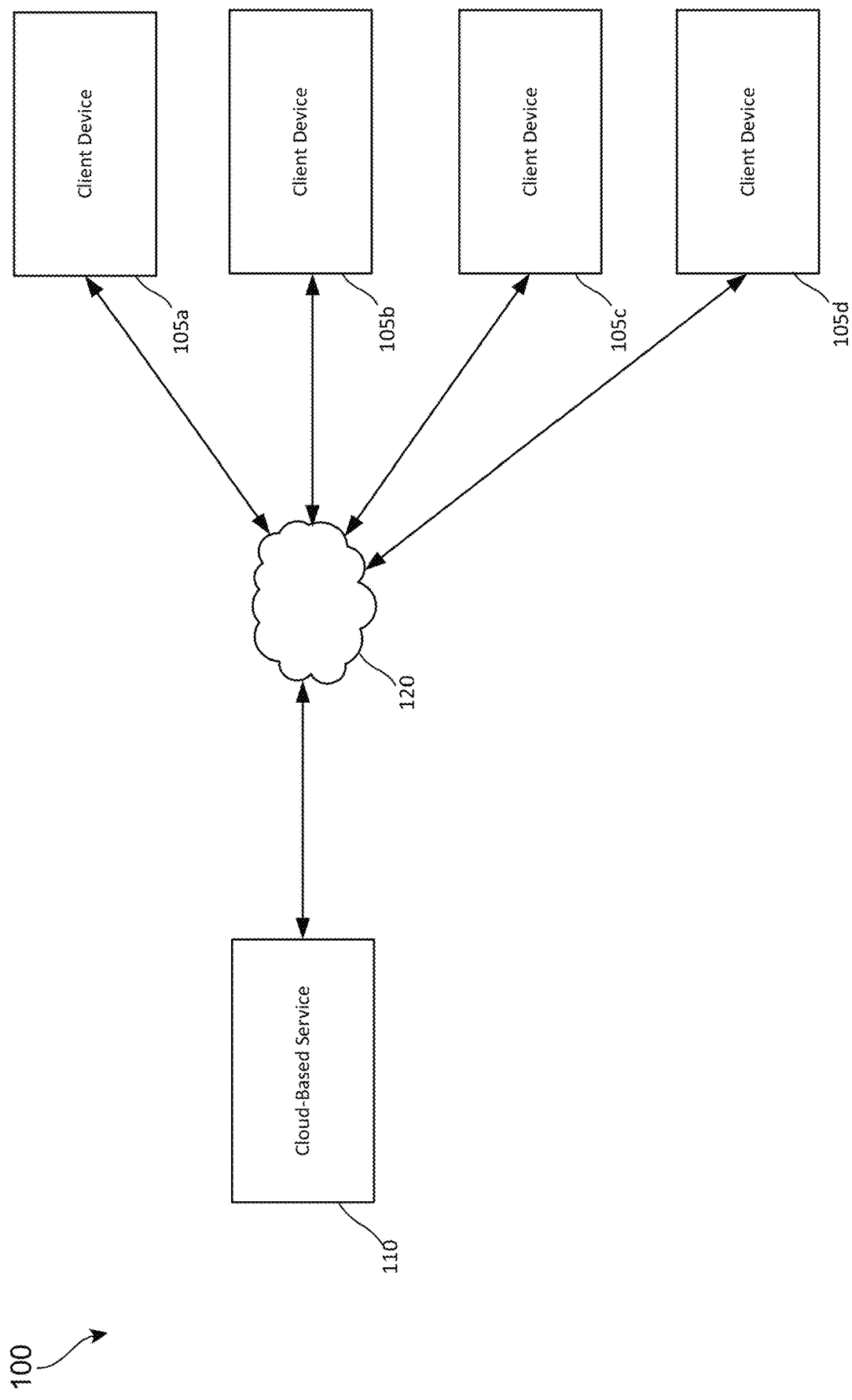
FIG. 1 depicts an example system upon which aspects of this disclosure may be implemented.

Deployment systems and policies that define the procedures and rules for deploying updates may not adequately take into consideration update dependencies. For example, updates may include new and/or updated product features that have dependencies defined in a previous update. Ring deployment enables updates to be delivered effectively and efficiently to a large number of technically and geographically diverse resources. However, ring deployment policies by nature are asynchronous resulting in updates being delivered to different resources at different times. As a result, updates may be delivered to some resources in random orders, and, in some cases, an update may be delivered to a resource earlier than the update from which it depends. This can cause feature dependency sequence violation and possible product functionality loss. Thus, there exists a technical problem of lack of mechanisms for taking into account feature dependency in deploying updates.

To address these technical problems and more, in an example, this description provides technical solutions in the form of deployment systems and methods that enable dependent updates (i.e., updates having a dependency on a previous update) to be identified so they may be deployed in a synchronous, or sequential, manner so as to prevent out of sequence delivery of updates. Update dependencies are tracked so that dependent updates are not deployed until parent updates have been completed. Deployment sequencing is implemented on top of existing asynchronous deployment policies so that asynchronous workflow remains intact and unaltered. The asynchronous workflow is upgraded to a synchronous (i.e., sequential) workflow for updates having dependencies to ensure that updates having dependencies are applied in the correct order.

As discussed below, an update includes programmed instructions, scripts, configuration data, and/or other content, referred to herein collectively as a "payload," that defines one or more changes, such as code updates, configuration changes, customizations, and the like, for a group of computing resources to be updated. A group of computing resources includes one or more computing devices, servers, cloud-based services, server farms, tenant sites, and/or any other logical grouping of resources.

In some implementations, updates are deployed based on a ring deployment scheme. A ring deployment scheme defines a configuration of rings, also referred to herein as "deployment stages" or just "stages", of increasing sizes for deploying and validating an update. Each ring level represents a sub-group of the computing resources to which the update is to be applied. In some implementations, a dependent update is divided into stages corresponding to the deployment stages of the ring deployment scheme. Each update stage includes one or more work items for applying the update to individual resources (e.g., computing devices, servers, server farms, tenant sites, data centers, cloud-based services, and the like) within the stage. For example, a deployment stage that involves deploying an update to a group of server farms may include a separate work item for applying the update to each respective server farm in the group.

The system is configured to receive a payload definition that includes payload information and attribute information pertaining to the update. The payload information may include the payload itself or provide a location of the payload in memory. The attribute information includes any information required by the system to determine the appropriate ring configuration for the update. To enable the identification and sequencing of dependent updates, the attribute information includes dependency information. The dependency information includes information indicating whether the update, an update stage, and/or a work item of the update is dependent upon a previous update. The dependency information may also include parent information identifying the parent update upon which an update depends.

In some implementations, the systems and methods described herein involve providing dependency information for each update, update stage, and/or work item entered into the system to ensure that dependent updates are identified and marked for sequential processing. In some implementations, the system may be configured to deny registration of updates in the system that do not provide dependency information for the update.

When a payload definition for a received update includes valid dependency information, the update may be registered in the system for deployment. The dependency information is then processed to identify whether the update is a dependent update. A current deployment stage (e.g., the current deployment ring) is also determined for the update. In some implementations, the system then determines a deployment ring configuration for deploying the update based on the attribute information included in the payload definition. An update stage is then registered, or created, in the system that includes one or more work items for applying the update to the resources in the update stage.

When an update is not a dependent update, the work items of the update stage are added in a created state and submitted to a payload delivery component which pushes the payload of the update to the resources defined by the work items. However, when an update is a dependent update, the work items are added to the update stage in a waiting state while the system determines a status, or state of the parent update (e.g., created, active, or finished). If the parent update is in the created or active state, the system monitors the parent update to determine when the parent update is finished in the current stage. When the parent update is finished in the current stage, the work items are changed from the waiting state to the created state and submitted to the payload delivery component which pushes the payload of the update to the resources defined by the work items.

In some implementations, update dependency is defined at the work item level. For example, a work item for a deployment stage of a dependent update may depend on a work item of a parent update for the deployment stage. The work item of the dependent update is held in the waiting state until the work item from the parent update has been completed at which point the work item from the dependent update may be created and pushed to the payload delivery component. Work items from a dependent update may depend on different work items of a parent update, in which case the system may monitor dependencies on a work item level to determine when parent work items have been completed so that dependent work items may be performed.

As will be understood by persons of skill in the art upon reading this disclosure, benefits and advantages provided by such implementations can include, but are not limited to, a technical solution to the technical problems associated with rolling out updates which may have dependencies on previous updates. The systems and methods described herein enable efficient policy-based update delivery to ensure that updates are delivered in sequence and only delivered when predecessor deployments are completed. The systems and methods described herein also require that dependency information is provided for each update to ensure that dependent updates are identified and marked for deployment sequencing.

FIG. 1 is a diagram showing an example computing environment 100 in which the techniques for implementing partitioned deployment policies for improved reliability of cloud-based services may be implemented. The computing environment 100 includes a cloud-based service 110 that implements the techniques for executing the deployment policies described herein. The example computing environment 100 also includes one or more client devices, such as the client devices 105a, 105b, 105c, and 105d. The client devices 105a, 105b, 105c, and 105d may communicate with the cloud-based service 110 via the network 120. The network 120 may be a dedicated private network and/or the combination of public and private networks commonly referred to as the Internet.

In the example shown in FIG. 1, the cloud-based service 110 is implemented as a cloud-based service or set of services. These services may include, but are not limited to, applications for creating, consuming, and/or modifying content, file storage and management platforms, collaboration and communications platforms, and other types of software as a service. The cloud-based service 110 may include numerous servers, network devices, databases and other components to support the various services that are provided by the cloud-based service 110. For example, the cloud-based service 110 may include one or more collections of computer servers, referred to as a server farm, which are configured to provide computational and/or storage resources for at least a portion of the services provided by the cloud-based service 110. The server farm may be configured to provide fail-over protection so that if a computer server within the server farm experiences a failure, the tasks assigned to that server are handed off to another computer server within the farm.

The client devices 105a, 105b, 105c, and 105d (referred to collectively as client device 105) enable users to access the services provided by the cloud-based service 110. Client devices 105 are computing devices that may be implemented as a portable electronic device, such as a mobile phone, a tablet computer, a laptop computer, a portable digital assistant device, a portable game console, and/or other such devices. The client device 105 may also be implemented in computing devices having other form factors, such as a desktop computer, vehicle onboard computing system, a kiosk, a point-of-sale system, a video game console, and/or other types of computing devices. While the example implementation illustrated in FIG. 1 includes four client devices, other implementations may include a different number of client devices that utilize the cloud-based service 110. Furthermore, in some implementations, some features of the services provided by the cloud-based service 110 are implemented by a native application installed on the client device 105, and the native application communicates with the cloud-based service 110 over a network connection to exchange data with the cloud-based service 110 and/or to access features implemented on the cloud-based service 110.

Figure 2:
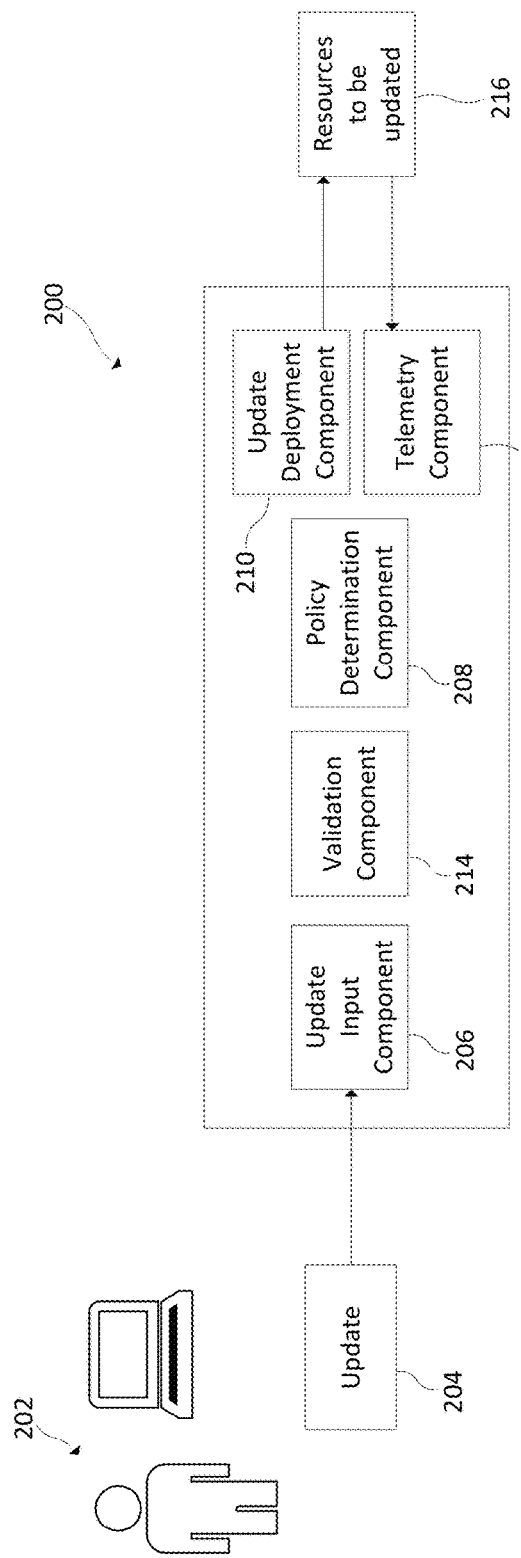
FIG. 2 shows an example of an update deployment system for the cloud-based service of FIG. 1.

Cloud-based services 110 includes an update deployment system that enables updates for maintaining application services, updating system infrastructure, updating features, adding new features, addressing issues, and the like to be created and deployed in a safe and reliable manner. An implementation of an update deployment system 200 is shown in FIG. 2. As part of the update deployment system 200, developers 202 develop updates 204 directed to maintenance (e.g., updating cloud infrastructure or application services), code fixes (e.g., correcting code), code updates (e.g., updating existing features), configurations (e.g., configuring settings or properties), customizations (e.g., enhancements requested by customers), and the like for a group of computing resources 216, such as one or more cloud-based services, server farms, tenants sites, data centers, and/or any other logical grouping of these and other types of computing resources.

The updates 204 include programmed instructions, scripts, configuration data, and/or other content, referred to herein collectively as "payload," that defines one or more changes, such as code updates, configuration changes, customizations, and the like, for a group of computing resources to be updated. The update deployment system 200 is configured to receive updates 204, to determine a deployment policy for each update, and to deploy each update according to its deployment policy. To this end, update deployment system 200 includes an update input component 206, a policy determination component 208, and an update deployment component 210.

Figure 3:
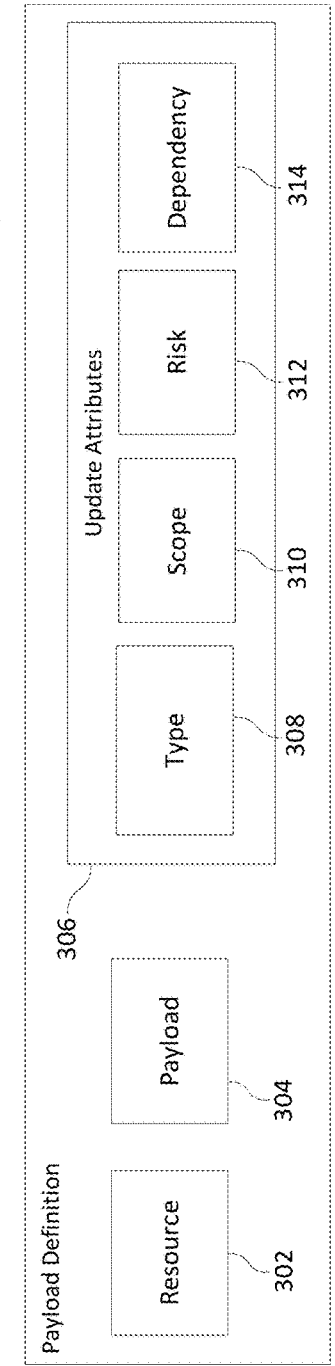
FIG. 3 shows a diagram of a job definition which defines attributes of a job for use with the update deployment system of FIG. 2.

In response to receiving a request to create an update, update input component 206 receives a payload definition for the update. The payload definition may be used by the system to register the update in the system and define a deployment policy for the update. In some implementations, update input component 206 includes a user interface that is presented on the display of a computing device that enables a user, such as administrator or other suitable personnel, to input the payload definition. An implementation of a payload definition 300 is depicted in FIG. 3. Payload definition 300 identifies the resource 302 (e.g., application, service, configuration file, and/or data file) that the update pertains to as well as the payload 304 (e.g., programmed instructions, script(s), configuration data and/or other content) for the update.

Payload definition 300 includes attribute information 306 that defines the attributes of the update which are required to determine a deployment policy for the update. In some implementations, attribute information 306 includes at least update type information 308, scope information 310, risk information 312, and dependency information 314. Update type information 308 includes information identifying the type of update, e.g., maintenance type, update type, configuration type, customization type, code fix type, and the like, and/or the type of update to be performed, e.g., read-write, read only, and the like.

The scope information 310 defines a scope for the update. As used herein, a "scope" may refer to any logical division of computing resources within a cloud computing environment. Scope 310 may indicate the type of device/resource to which the update pertains, e.g. client device, virtual machine, server, farm, database, operating system, and the like, the type of user to which the update pertains, e.g., tenant, customer, internal, manager, regional manager and the like, and/or the geographic range to which the update pertains, e.g., city, state, country, zone, regional, global and the like. In some implementations, a plurality of scopes are predefined for the system such that the user input for the scope must correspond to at least one of the predefined scopes.

The risk information 312 indicates a risk level associated with the update. For example, the risk information 312 may indicate whether the update is low, medium, or high risk. Other implementations may include a numerical rating or other indication that represents a risk level associated with the update. The risk level may be determined based on a potential impact of the job on the customer base. A high-risk update may be associated with features used by many users and may significantly impact the ability of these users to utilize the resources of the system if the updates do not operate as expected. A medium-risk update may impact fewer users than a high-risk update, may impact features that are used by fewer users, and/or may not as severely impact the ability of users to use the resources of the system. A low-risk update may impact few users and/or impact features that are infrequently used or would not impact the ability of most users to use the services provided by the resources of the system. As other examples, a read-only update property for a database scope may be associated with low risk, a read-write update property on a tenant scope may be associated with medium risk, and a read-write update property for a multiple-farm scope may be associated with high risk. In embodiments, global scope update may automatically be considered high risk regardless of the type of update.

The dependency information 314 includes information indicating whether or not the update is a dependent update. The dependency information may also include information identifying a parent update that the dependent update is dependent upon. In an example, the dependency information indicates that the dependent update as a whole is dependent upon a parent update. In other example, the dependency information indicates that certain components of the dependent update depend on certain components of a parent update. In any case, the dependency information is used to identify update dependencies and mark dependent updates for deployment sequencing.

Referring again to FIG. 2, the policy determination component 208 receives the payload definition 300 and processes the resource 302, payload 304, and attribute information 306 to determine one or more deployment policies for deploying the update to the group of computing resources. Deployment policies define various parameters for deploying an update, such as timing for deployment, deployment ring configuration, throttling procedure, cool-down periods (i.e., bake times), and the like. In some implementations, different parameters are defined for different updates based on the resource 302, payload 304, and/or update attributes 306 (e.g., update type 308, scope 310, risk 312, and dependency 314).

The timing defined for deploying an update may indicate one or more of a start time, an end time, whether the update should be deployed during peak hours or off-peak hours, the order/priority of the update relative to other updates, and the like. The timing may depend on the attributes of the update. For example, the update type attribute 308 may indicate that the update is for addressing a critical issue in a cloud-based service, in which case, the update may be given a high priority and/or an earlier start time than other update types, such as maintenance updates, customization updates, updates for little-used features, and the like.

Figure 4:
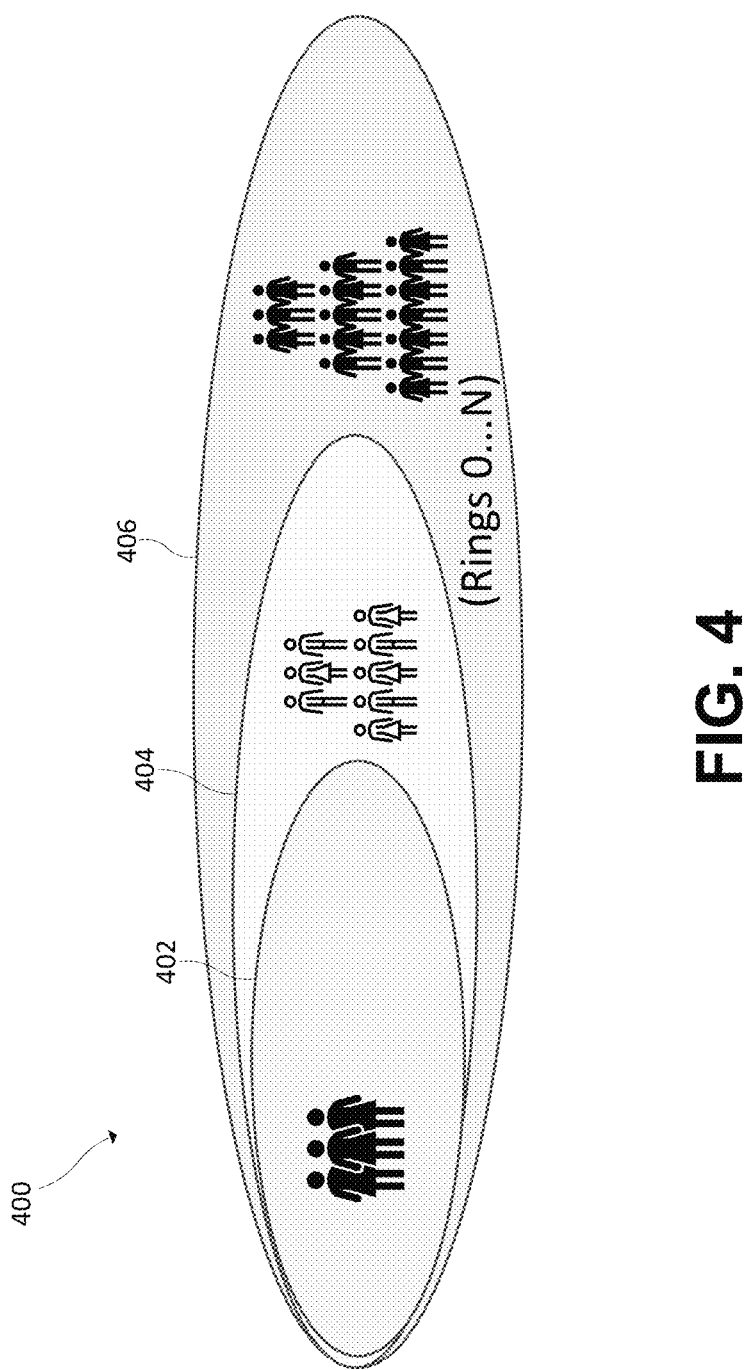
FIG. 4 depicts a diagram of an example ring configuration for deploying updates on a cloud-based service architecture.

A deployment ring configuration defined for an update refers to the configuration of rings (e.g., number and/or type of rings) used in a ring level validation scheme for rolling out an update. A ring configuration typically includes multiple ring levels of increasing size with each ring level being included in the ring level of the next largest size. Each ring level represents a number of devices and/or users to which the update is to be deployed, with smaller rings representing lower numbers of devices/users and larger rings representing larger numbers of devices/users. An example of a ring configuration 400 for an update is shown in FIG. 4. The ring configuration 400 includes three rings 402, 404, and 406 which correspond to a first ring level 402, a second ring level 404, and a third ring level 406. The first ring level 402 is the smallest ring level and is included in the second ring level 404. The second ring level 404 is the next smallest ring level and is included in the third ring level 406.

A ring deployment scheme enables validation of updates. For example, according to a ring validation scheme, an update is first deployed to the devices/users in the smallest ring level, e.g., first ring level 402 of the ring configuration 400. The first ring level 402 typically includes a small number of devices/users and may correspond to an internal ring such that the devices/users correspond to developers and/or engineers which can troubleshoot and/or debug the update. The update is then deployed to the second ring level 404 which includes more devices/users than the first ring level 402 and may correspond to another internal ring, a pre-production ring, or a production ring. The update is then deployed to the third ring level 406 which includes even more devices/users and may correspond to a pre-production ring or a production ring. Although three rings 402, 404, 404 are shown in the example of FIG. 4, the number and/or type of rings (e.g., internal, external, pre-production, production) included in a ring configuration associated with a particular deployment may be any suitable number of rings and/or type of ring depending on the characteristics of the update.

The throttling procedure for an update refers to methods for throttling (i.e., slowing down) deployment of an update within the scope of the update and/or within one or more of the ring levels for the update. For example, a deployment policy for an update may indicate that the update should be throttled by providing the update to a first percentage (e.g., 1%) of users/devices within the scope, then a second percentage (e.g., 5%) of users/devices within the scope, then a third percentage (e.g., 10%) of the users/devices within the scope, and so on until 100% of users/devices within the scope have received the update. Different throttling schemes (e.g., percentages and/or increments) may be defined for different updates depending at least in part on the attributes of the update. In implementations, it may be desirable for updates having a high risk to have a slower deployment so smaller percentage increments may be used to throttle the deployment. For updates having a low risk, the throttling scheme may utilize larger percentage increments or may be done away with altogether.

Deployment policies may define the length of cool-down periods, or bake times, to be used during update deployment. A bake-time refers to a period of time after an update has been deployed to a ring stage and/or throttling stage before the job is deployed to the next stage. During the bake-time, telemetry data and/or customer feedback data may be collected from users/devices in each stage and evaluated to determine whether the update should be deployed to the stage or be halted due to problems with the update. Longer bake-times may be defined for high-risk updates while lower bake-times may be defined for low-risk updates.

Once the one or more deployment policies have been determined for an update, the update deployment component 210 is configured to deploy the update in accordance with the parameters defined by the one or more deployment policies determined for the update. For example, the update deployment component 210 may be configured to transmit the payload 304 associated with the update to the resources associated with a first ring level, e.g., ring level 402, of a ring configuration defined for the update based on any timing/priority information defined for the update. Once the bake-time for the update in the first ring level has passed, a determination may be made as to whether the update should be deployed to a next ring level, such as ring level 404, or halted.

In some implementations, system 200 includes a telemetry component 212 that is configured to receive telemetry data from components of the group of resources associated with each ring level of a ring configuration. The telemetry component 212 may be configured to analyze the telemetry data and/or user feedback to determine a performance level of the update within each ring level. Based on the performance level indicated by the telemetry component 212 for each ring level, the update deployment component 210 may deploy the update to the next ring level or halt the deployment. For example, the update deployment component 210 may halt the deployment to subsequent rings when the performance level of an update indicates the update is not operating as expected. Otherwise, the update deployment component 210 may deploy the update to the next ring level. In some implementations, the resources to be updated include update processing components that receive the payload of the update and apply the update to the resources in any suitable manner.

In the manner described above, updates are deployed on a stage-by-stage basis through the deployment rings in accordance with the parameters of the deployment policies for the updates, such as timing, deployment ring configuration, throttling procedures, bake-times, and the like. In embodiments, the payload definition for an update is processed by the update deployment system at each stage (e.g., each ring level) in the deployment process. This enables the system to define the work items for each stage for applying the update to the resources associated with that stage. For example, a deployment stage that involves deploying an update to a group of server farms may include a separate work item for applying the update to each respective server farm in the group.

In some implementations, update dependency is defined at the update level, (e.g., an update is dependent upon parent update) or work item level (e.g., work item is dependent upon a parent work item). For example, a work item for a deployment stage of a dependent update may depend on a work item of a parent update for the deployment stage. The work item of the dependent update is held in the waiting state until the work item from the parent update has been completed, at which point the work item from the dependent update may be created and pushed to the payload delivery component. Work items from a dependent update may depend on different work items of a parent update, in which case the system may monitor dependencies on a work item level to determine when parent work items have been completed so that dependent work items may be performed.

When an update is registered in the system, an update stage is added in a created state indicating that the update stage is in the process of being deployed. In addition, the system adds the work items for applying the update to the resources associated with the current deployment stage to the update stage. When the update is not a dependent update, the work items may be added to the update stage in a created state indicating that they are ready to be processed by the update deployment component. As discussed below, when the update is a dependent update, the work items for the update stage are added in a waiting state indicating that they are not ready to be processed by the update deployment component. The work items remain in the waiting state while the status of a parent update and/or parent work items is determined and/or monitored.

When the parent update and/or parent work items for a dependent update have been completed, the work items of the dependent update may be updated to a created state indicating that they are ready to be deployed. In some implementations, when the work items for the dependent update have finally been created, the work items may be pushed (e.g., autopushed) to the resources to be updated. In other embodiments, the work items may be processed by the update deployment component in the same manner as non-dependent updates. In any case, once the work items of a dependent update have been created, the work items may be deployed in the stage in accordance with the deployment policy determined for the update by the policy determination component 208.

As discussed above, previously known deployment policies that define the procedures and rules for deploying updates in general do not take into consideration update dependencies. Updates may include new and/or updated product features that have dependencies defined in a previous update or may address issues of previous updates. Updates are typically deployed asynchronously across the various subsystems and groups of computing resources that are to be updated, resulting in updates being delivered to different resources at different times. As a result, it is possible for dependent updates to be delivered to some resources earlier than the parent update from which it depends. This can cause feature dependency sequence violation and possible product functionality loss.

To address these issues, the update deployment system 200 includes a build time validation component 214 to ensure that the payload definition 300 complies with any predefined rules for the system before the update can be registered in the system. In implementations, a rule may be defined for the system requiring one or more attributes of an update to be defined before the update can be registered. For example, a rule may require that the scope attribute 310 and the risk attribute 312 be defined for an update before the update can be registered. In implementations, rules may be attribute-based such that jobs having certain attributes may have additional requirements for job creation. For example, a rule may be defined for updates having the global scope attribute and/or the high-risk attribute such that authorization of some kind may be required before the update can be created.

In accordance with this disclosure, a rule is defined for the system requiring the dependency information to be provided for each update prior to registration. The build time validation component 214 is configured to process the payload definition to verify whether dependency information 314 is provided for the payload definition. The build time validation component 214 may be configured to determine whether the dependency information is in a required format and/or within a valid range of values. By requiring that dependency information be provided for each update, the system can readily identify dependent updates so dependent updates may be deployed to each ring stage in the correct sequence. In embodiments, the validation component 214 may be configured to deny registration if the dependency information for an update identifies a parent update that has been aborted. In other words, the system will not let an update be registered that is dependent upon an aborted update. In these cases, the validation component may generate an alert indicating that the parent update has been aborted and to identify another parent update to use for dependency or remove the dependency indication from the payload definition.

If the build time validation component 214 determines that the payload definition 300 received by the update input component 206 does not satisfy all predefined rules for update registration, e.g., does not include required attribute information and/or does not indicate that other update creation requirements are met (such as extra approval in the case of global and/or high risk updates), the build time validation component may reject the request to register the update in the system. In some implementations, build time validation component 214 is configured to display a warning to a user via the user interface that certain information is required and/or has not been provided in the payload definition. If the build time validation component 214 determines that the payload definition received satisfies all predefined rules for update registration, build time validation component 214 may be configured to provide an indication via the user interface that the update has been validated so that the update registration process may continue with the policy determination component 208.

Figure 5:
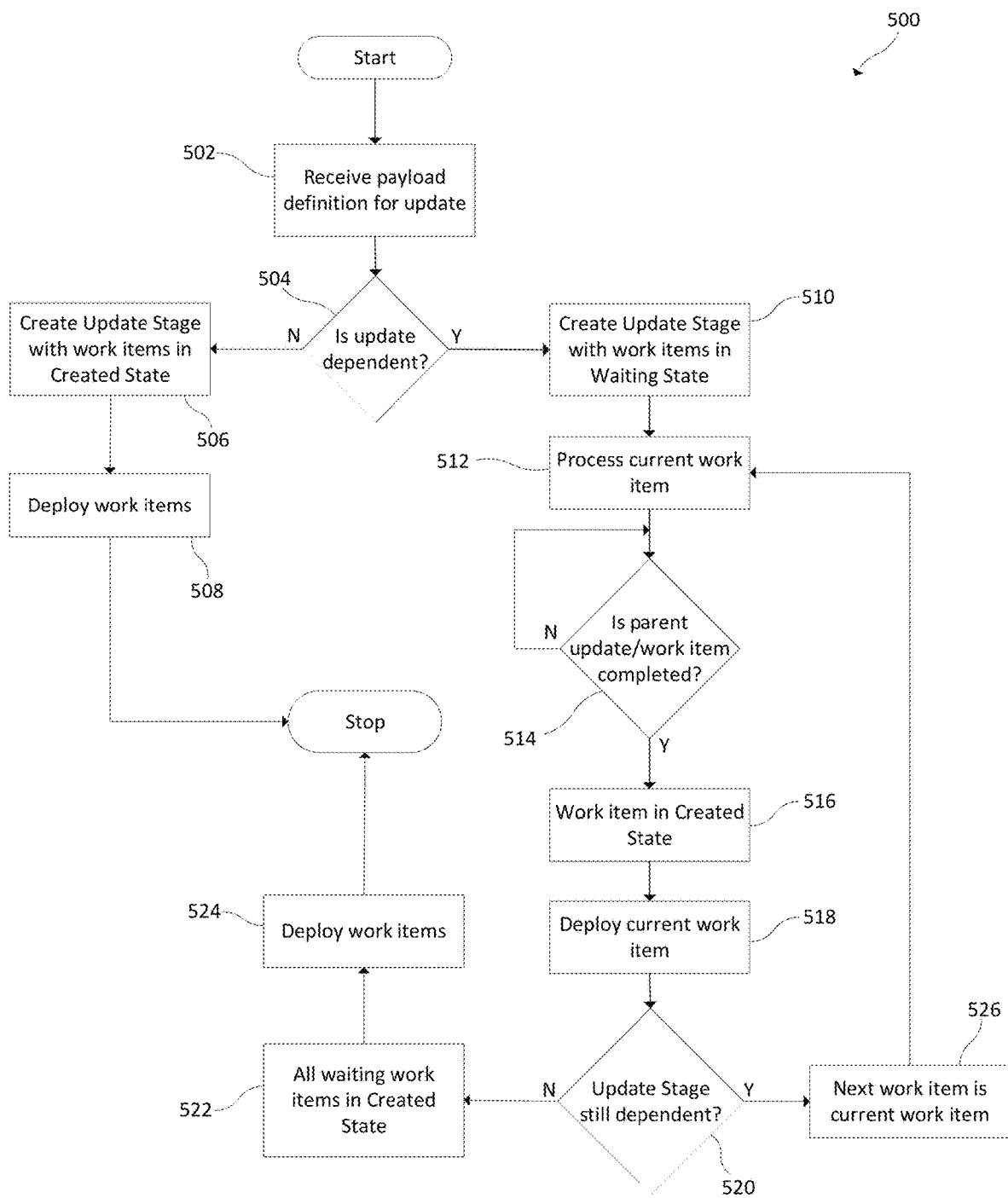
FIG. 5 depicts a flowchart of an example method for processing updates asynchronously and synchronously based on dependencies.

Referring now to FIG. 5, an example method for deploying updates is shown that enables asynchronous processing of non-dependent updates as well as synchronous process of dependent updates. The method begins with receiving a payload definition for an update (block 502). The payload information is processed to determine whether the update is dependent update, e.g., by accessing the dependency information provided with the payload definition (block 504). If the update is not a dependent update, an update stage is created for the current deployment stage with work items that are added in a created state indicating that they are ready to be processed by the update deployment component (block 506). The update deployment component then deploys the update in accordance with a deployment policy for the update (block 508).

If the update is a dependent update, an update stage is created for the current deployment stage with work items that are added in a waiting state indicating that they are not to be deployed (block 510). A first (e.g., current) work item is then processed (block 512). For each work item, the parent update and/or parent work item for the work item is monitored to await completion of the parent update and/or parent work item (block 514). Once the parent update and/or parent work item has been completed, the work item for the update stage is updated from the waiting state to a created state (block 516) and deployed to the corresponding resources to be updated (block 518). In some embodiments, the work item may be pushed (e.g., autopushed) to the resources to be updated. In other embodiments, the work items may be deployed by the update deployment component. In any case, all created work items are deployed in accordance the deployment policy for the update.

In some implementations, a determination may then be made as to whether the update stage is still dependent on a parent update and/or parent work item (block 520). For example, a determination may be made as to whether any work items remain in the current update stage that are dependent on a parent update and/or parent work item. If the update stage is found to no longer be dependent, all waiting work items are then updated to a created state (block 522) and deployed to the corresponding resources to be updated (block 524). If the update stage is found to still be dependent, the next work item is made the current work item for processing by returning control to block (block 526).

In embodiments, if a parent update has been suspended (e.g., paused or stopped) for whatever reason, a child update may be allowed to continue up to the point at which the parent update was suspended, e.g., the last stage that the parent update completed, at which point the child update will also be placed in a suspended state. Once a suspended parent update is resumed, the child update may be returned to the active state. A parent update may be aborted after being suspended. The system may be configured to prevent parent updates from being aborted while the parent update has dependents. The system may require that a new parent update be assigned to child updates or that all child updates be aborted before a parent update is allowed to be aborted. Similarly, if a parent update is to be rolled back, the system may require that a new parent update be assigned to child updates or that dependency of the child updates on the parent update be severed before the roll back of the parent update is allowed to commence.

In embodiments, when a new resource is added to the computing resources to be updated before a dependent update is applied, the system is configured to verify whether the parent update has been previously applied to the new resource before the dependent update is allowed to proceed. For example, if a new server farm is added to a group of server farms before a dependent update, the system placed the dependent update in a waiting state while the system verifies whether the parent update has been applied to the new server farm. When a new resource is added, a new work item is added to the dependent update for applying the update to the new resource (e.g., server farm). In embodiments, the system is configured to verify that a parent update has been applied to the new resource by checking the work items of the parent update to see if the parent update includes a work item associated with the new resource. If the parent update does not have a work item associated with the new resource, the work item is added and deployed to the new resource while the dependent update is still in the waiting state. Once the parent update has been completed on the new resource, the dependent update is returned to the active state so that the dependent update can be applied to the new resource.

Figure 6:
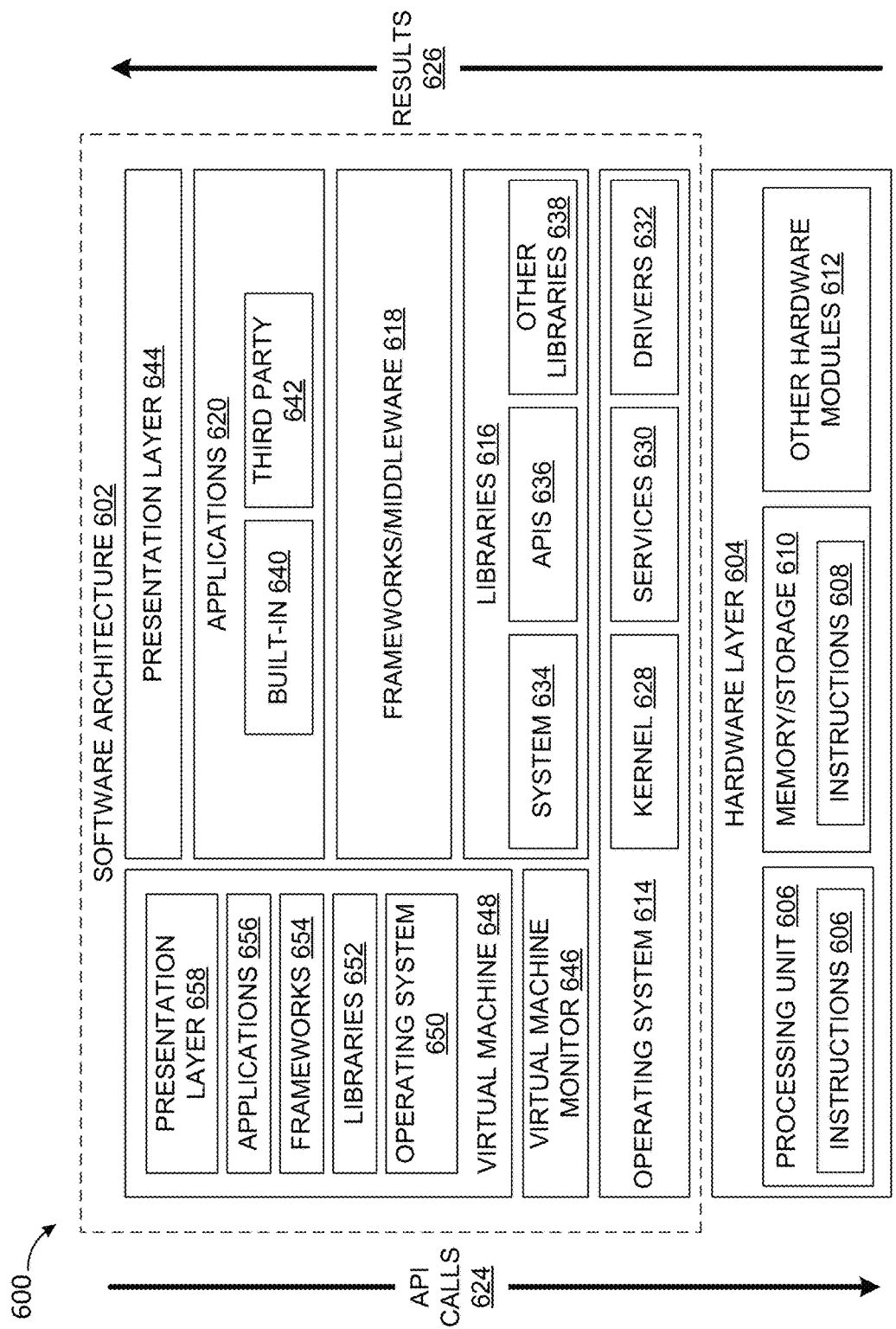
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
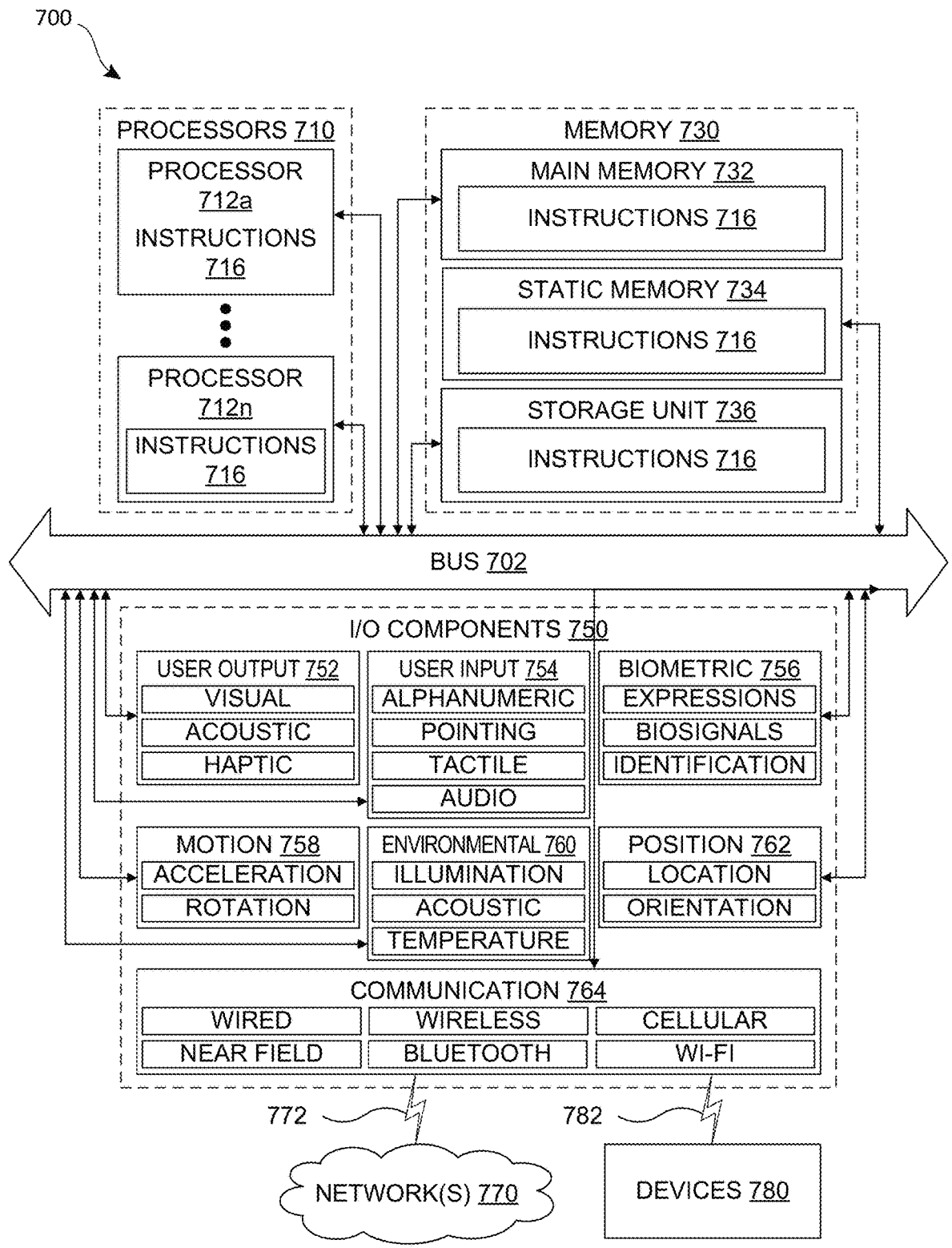
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760, and/or position components 762, among a wide array of other physical sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory comprising executable instructions that, when executed by the processor, cause the data processing system to perform functions of:
receiving a payload definition defining an update to be deployed to a group of computing resources, the payload definition including attribute information, the attribute information including dependency information for the update;
determining whether the update is a dependent update based on the dependency information;
in response to the dependency information indicating that the update is a dependent update, creating an update stage for a current deployment stage with work items for applying the update to the computing resources associated with the current deployment stage;
monitoring a parent update of the dependent update for completion; and
in response to the parent update being completed, executing the work items so as to apply the update to the computing resources associated with the current deployment stage.

Item 2. The data processing system of item 1, wherein the work items are added in a waiting state, and
wherein, when the parent update has been completed, the work items are changed to a created state for deployment to the computing resources to be updated.

Item 3. The data processing system of any of items 1-2, wherein executing the work items so as to apply the update to the computing resources associated with the current deployment stage further comprise:
executing a first work item when the parent update has been completed;
determining whether the update includes any other dependent work items; and
in response to the update including no other dependent work items, changing all remaining work items to a created state for deployment to the computing resources to be updated.

Item 4. The data processing system of any of items 1-3, wherein the work items are deployed based on a deployment policy determined for the update.

Item 5. The data processing system of any of items 1-4, wherein the functions further comprise:
identifying the parent update based on the dependency information in the payload definition.

Item 6. The data processing system of any of items 1-5, wherein the functions further comprise:
identifying a parent work item exists for a current work item for the update stage;
determining whether the parent work item exists in the parent update; and
in response to the parent work item not existing, creating the parent work item in the parent update for the current work item.

Item 7. The data processing system of any of items 1-6, wherein the functions further comprise:
preventing suspension of the parent update while the update is still dependent upon the parent update.

Item 8. The data processing system of any of items 1-7, wherein the functions further comprise:
preventing the suspension of the parent update until an indication is received that a dependency of the update on the parent update has been severed.

Item 9. The data processing system of any of items 1-8, wherein the functions further comprise:
preventing the suspension of the parent update until an indication is received that a dependency of the update has been changed from the parent update to a new parent update.

Item 10. The data processing system of any of items 1-9, wherein the functions further comprise:
in response to the dependency information indicating that the update is not a dependent update, creating an update stage with work items for applying the update to the computing resources associated with the current deployment stage, the work items being added in a created state; and deploying the work items to the computing resources to be updated based on a deployment policy determined for the update.

Item 11. A method of deploying dependent updates to a group of computing resources comprising:
- receiving a payload definition defining an update to be deployed to the group of computing resources, the payload definition including attribute information, the attribute information including dependency information for the update;
- determining whether the update is a dependent update based on the dependency information;
- in response to the dependency information indicating that the update is a dependent update, creating an update stage for a current deployment stage with work items for applying the update to the computing resources associated with the current deployment stage;
- monitoring a parent update of the dependent update for completion; and
- in response to the parent update being completed, executing the work items so as to apply the update to the computing resources associated with the current deployment stage.

Item 12. The method of item 11, wherein the work items are added in a waiting state, and
- wherein, when the parent update has been completed, the work items are changed to a created state for deployment to the computing resources to be updated.

Item 13. The method of any of items 11-12, wherein executing the work items so as to apply the update to the computing resources associated with the current deployment stage further comprise:
- executing a first work item when the parent update has been completed;
- determining whether the update includes any other dependent work items; and
- in response to the update including no other dependent work items, changing all remaining work items to a created state for deployment to the computing resources to be updated.

Item 14. The method of any of items 11-13, wherein the work items are deployed based on a deployment policy determined for the update.

Item 15. The method of any of items 11-14, further comprising:
- identifying the parent update based on the dependency information in the payload definition.

Item 16. The method of any of items 11-15, further comprising:
- identifying a parent work item exists for a current work item for the update stage;
- determining whether the parent work item exists in the parent update; and
- in response to the parent work item not existing, creating the parent work item in the parent update for the current work item.

Item 17. A non-transitory computer readable medium on which are stored instructions that, when executed, cause a programmable device to perform functions of:
- receiving a payload definition defining an update to be deployed to a group of computing resources, the payload definition including attribute information, the attribute information including dependency information for the update;
- determining whether the update is a dependent update based on the dependency information;
- in response to the dependency information indicating that the update is a dependent update, creating an update stage for a current deployment stage with work items for applying the update to the computing resources associated with the current deployment stage;
- monitoring a parent update of the dependent update for completion; and
- in response to the parent update being completed, executing the work items so as to apply the update to the computing resources associated with the current deployment stage.

Item 18. The non-transitory computer readable medium of item 17, wherein the work items are added in a waiting state, and
- wherein, when the parent update has been completed, the work items are changed to a created state for deployment to the computing resources to be updated.

Item 19. The non-transitory computer readable medium of any of items 17-18, wherein executing the work items so as to apply the update to the computing resources associated with the current deployment stage further comprise:
- executing a first work item when the parent update has been completed;
- determining whether the update includes any other dependent work items; and
- in response to the update including no other dependent work items, changing all remaining work items to a created state for deployment to the computing resources to be updated.

Item 20. The non-transitory computer readable medium of any of items 17-19, wherein the functions further comprise:
- in response to the dependency information indicating that the update is not a dependent update, creating the update stage with work items for applying the update to the computing resources associated with the current deployment stage, the work items being added in a created state; and
- deploying the work items to the computing resources to be updated based on a deployment policy determined for the update.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system for deployment of updates in a cloud-based service, comprising:
    a processor; and
    a memory in communication with the processor, the memory comprising executable instructions that, when executed by the processor, cause the data processing system to perform functions of:
    receiving, at an input component of the update deployment system, a payload definition defining an update to be deployed to a group of computing resources of the cloud-based service, the payload definition including attribute information including dependency information for the update, wherein the update includes programmed instructions, scripts, configuration data, or content that defines one or more code updates, configuration changes, or customizations for the group of computing resources;
    determining whether the update is a dependent update for a current deployment stage based on the dependency information; and
    in response to the dependency information indicating that the update is a dependent update for the current deployment stage, performing a synchronous deployment process comprising:
        creating an update stage with a sequence of work items in a waiting state, the work items for applying the update to the computing resources; and
        performing a work item deployment process for a current work item in the sequence of work items, the work item deployment process including:
            maintaining the current work item in the waiting state until all parent updates of the current work item have been completed;
            after all of the parent updates of the current work item have been completed, changing the current work item from the waiting state to a created state and deploying the current work item to the update stage so that the current work item is applied to the computing resources;
            after the current work item has been deployed, determining whether the dependency information indicates that the update is still a dependent update;
            in response to the dependency information indicating that the update is still a dependent update, repeating the work item deployment process with a next work item in the sequence of work items as the current work item; and
    in response to the dependency information indicating that the update is a non-dependent update, performing an asynchronous deployment process to deploy any remaining work items in the sequence of work items, the asynchronous deployment process including:
        changing the remaining work items in the sequence of work items to the created state; and
        deploying the remaining work items in the sequence of work items to the update stage asynchronously such that the remaining work items in the sequence of work items are applied to the computing resources without checking to see if parent updates associated with the remaining work items in the sequence of work items have already been applied to the computing resources,
    wherein sequencing of the deployment is implemented concurrently with asynchronous deployment policies so that the asynchronous deployment process is unaltered.

2. The data processing system of claim 1, wherein the work items are deployed based on a deployment policy determined for the update.

3. The data processing system of claim 1, wherein the functions further comprise:
    identifying a parent update based on the dependency information in the payload definition, the parent update being defined and deployed according to a previously submitted payload definition and including at least a parent work item that is to be performed to update a computing resource before a work item in the dependent update is performed to update the computing resource.

4. The data processing system of claim 3, wherein the functions further comprise:
    determining whether the current work item in the dependent update requires a parent work item in a parent update to be performed before the current work item is performed;
    in response to determining that the current work item does not require a parent work item to be performed, changing the current work item from the waiting state to the created state and deploying the current work item to the update stage;

in response to determining that the current work item requires a parent work item in a parent update, determining whether the parent work item exists in the parent update;

in response to the parent work item not existing, creating the parent work item in the parent update for the current work item, maintaining the current work item in the waiting state until the parent work item has been completed, and then changing the current work item from the waiting state to the created state and deploying the current work item to the update stage; and in response to determining that the parent work item exists in the parent update, changing the current work item from the waiting state to the created state and deploying the current work item to the update stage.

5. The data processing system of claim 1, wherein the functions further comprise:

preventing suspension of a parent update while the update is still dependent upon the parent update.

6. The data processing system of claim 5, wherein the functions further comprise:

preventing the suspension of the parent update until an indication is received that a dependency of the update on the parent update has been severed.

7. The data processing system of claim 5, wherein the functions further comprise:

preventing the suspension of the parent update until an indication is received that a dependency of the update has been changed from the parent update to a new parent update.

8. A method of deploying dependent updates to a group of computing resources of a cloud-based service, the method comprising:

receiving, at an input component of a update deployment system, a payload definition defining an update to be deployed to a group of computing resources of the cloud-based service, the payload definition including attribute information including dependency information for the update, wherein the update includes programmed instructions, scripts, configuration data, or content that defines one or more code updates, configuration changes, or customizations for the group of computing resources;

determining whether the update is a dependent update for a current deployment stage based on the dependency information; and in response to the dependency information indicating that the update is a dependent update for the current deployment stage, performing a synchronous deployment process comprising:

creating an update stage with a sequence of work items in a waiting state, the work items for applying the update to the computing resources; and performing a work item deployment process for a current work item in the sequence, the work item deployment process including:

maintaining the current work item in the waiting state until all parent updates of the current work item have been completed;

after all of the parent updates of the current work item have been completed, changing the current work item from the waiting state to a created state and deploying the current work item to the update stage so that the current work item is applied to the computing resources;

after the current work item has been deployed, determining whether the dependency information indicates that the update is still a dependent update;

in response to the dependency information indicating that the update is still a dependent update, repeating the work item deployment process with a next work item in the sequence of work items as the current work item; and in response to the dependency information indicating that the update is a non-dependent update, performing an asynchronous deployment process to deploy any remaining work items in the sequence of work items, the asynchronous deployment process including:

changing the remaining work items in the sequence of work items to the created state; and deploying the remaining work items in the sequence of work items to the update stage asynchronously such that the remaining work items in the sequence of work items are applied to the computing resources without checking to see if parent updates associated with the remaining work items in the sequence of work items have already been applied to the computing resources, wherein sequencing of the deployment is implemented concurrently with asynchronous deployment policies so that the asynchronous deployment process is unaltered.

9. The method of claim 8, wherein the work items are deployed based on a deployment policy determined for the update.

10. The method of claim 8, further comprising:

identifying a parent update based on the dependency information in the payload definition.

11. The method of claim 10, further comprising:

determining whether the current work item in the dependent update requires a parent work item in a parent update to be performed before the current work item is performed;

in response to determining that the current work item does not require a parent work item to be performed, changing the current work item from the waiting state to the created state and deploying the current work item to the update stage;

in response to determining that the current work item requires a parent work item in a parent update, determining whether the parent work item exists in the parent update;

in response to the parent work item not existing, creating the parent work item in the parent update for the current work item, maintaining the current work item in the waiting state until the parent work item has been completed, and then changing the current work item from the waiting state to the created state and deploying the current work item to the update stage; and in response to determining that the parent work item exists in the parent update, changing the current work item from the waiting state to the created state and deploying the current work item to the update stage.

12. A data processing system for an update deployment system of a cloud-based service, comprising:

a processor; and a memory in communication with the processor, the memory comprising executable instructions that, when executed by the processor, cause the data processing system to perform functions of:

receiving, at an input component of the update deployment system, a payload definition defining an update to be deployed to a group of computing resources of the cloud-based service, the payload definition including dependency information;

determining based on the dependency information whether the current update is dependent upon a parent update, the parent update being previously deployed and including at least one parent work item that is to be performed to update a computing resource before a work item in the current update is performed to update the computing resource; and in response to the dependency information indicating that the current update is a dependent update for a current deployment stage, performing a synchronous deployment process comprising:

creating an update stage with a sequence of work items in a waiting state, the work items for applying the update to the computing resources; and performing a work item deployment process for a current work item in the sequence of work items, the work item deployment process including:

maintaining the current work item in the waiting state until all parent updates of the current work item have been completed;

after all of the parent updates of the current work item have been completed, changing the current work item from the waiting state to a created state and deploying the current work item to the current deployment stage so that the current work item is applied to the computing resources;

after the current work item has been deployed, determining whether the dependency information indicates that the current update is still a dependent update;

in response to the dependency information indicating that the current update is still a dependent update, repeating the work item deployment process with a next work item in the sequence of work items as the current work item; and in response to the dependency information indicating that the update is a non-dependent update, performing an asynchronous deployment process to deploy any remaining work items in the sequence of work items, the asynchronous deployment process including:

changing the remaining work items in the sequence of work items to the created state; and deploying the remaining work items in the sequence of work items to the update stage asynchronously such that the remaining work items in the sequence of work items are applied to the computing resources without checking to see if parent updates associated with the remaining work items in the sequence of work items have already been applied to the computing resources, wherein sequencing of the deployment is implemented concurrently with asynchronous deployment policies so that the asynchronous deployment process is unaltered.

13. The data processing system of claim 12, wherein:
the parent update is deployed to the current deployment stage concurrently with the current update.

14. The data processing system of claim 13, wherein:
work items of the parent update are deployed to the current deployment stage using the synchronous deployment process while the work items of the parent update are dependent upon a previous update, and the work items of the parent update are deployed to the current deployment stage using the asynchronous deployment process while the work items of the parent update are not dependent upon a previous update.

* * * * *